(12) United States Patent
Otomo et al.

(10) Patent No.: US 12,736,507 B2
(45) Date of Patent: Sep. 15, 2026

(54) PREPARATIVE SYSTEM

(71) Applicant: SHIMADZU CORPORATION, Kyoto (JP)

(72) Inventors: Iori Otomo, Kyoto (JP); Tomoyuki Yamazaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 275 days.

(21) Appl. No.: 18/727,358

(22) PCT Filed: Oct. 27, 2022

(86) PCT No.: PCT/JP2022/040256

§ 371 (c)(1),
(2) Date: Jul. 9, 2024

(87) PCT Pub. No.: WO2023/135900

PCT Pub. Date: Jul. 20, 2023

(65) Prior Publication Data

US 2025/0093313 A1 Mar. 20, 2025

(30) Foreign Application Priority Data

Jan. 11, 2022 (JP) ................................ 2022-002649

(51) Int. Cl.
*G01N 30/82* (2006.01)
*B01D 15/18* (2006.01)
(Continued)

(52) U.S. Cl.
CPC ......... *G01N 30/80* (2013.01); *B01D 15/1864* (2013.01); *B01D 15/247* (2013.01);
(Continued)

(58) Field of Classification Search
CPC ........ G01N 30/80; G01N 30/34; G01N 30/46; G01N 30/7233; G01N 2030/027;
(Continued)

(56) References Cited

U.S. PATENT DOCUMENTS 4,806,250 A * 2/1989 Takata ............... B01D 15/1871 210/659
2019/0391117 A1* 12/2019 Yamazaki .............. G01N 30/04
2021/0349062 A1 11/2021 Shagawa et al.

FOREIGN PATENT DOCUMENTS

CN 111487358 A * 8/2020 ............. G01N 30/54
JP 2005-241580 A 9/2005
(Continued)

OTHER PUBLICATIONS

International Search Report for corresponding International Application No. PCT/JP2022/040256 dated Jan. 10, 2023.
(Continued)

*Primary Examiner* — Robert R Raevis
(74) *Attorney, Agent, or Firm* — Renner, Otto, Boisselle & Sklar, LLP

(57) ABSTRACT

A first mobile phase is supplied by a mobile phase supplier. A sample is supplied by a sample supplier to the first mobile phase supplied by the mobile phase supplier. The sample supplied by the sample supplier passes through a separation column. The sample that has passed through the separation column is detected by a detector. Based on a detection result provided by the detector, sample components that have passed through the separation column are collected by a trap column. A make-up solution is supplied to the detector by a liquid sender, and an eluent for eluting a sample is supplied to the trap column by the liquid sender.

8 Claims, 13 Drawing Sheets

(51) Int. Cl.

| | |
|---|---|
| ***B01D 15/24*** | (2006.01) |
| ***G01N 30/34*** | (2006.01) |
| ***G01N 30/46*** | (2006.01) |
| ***G01N 30/72*** | (2006.01) |
| ***G01N 30/80*** | (2006.01) |
| *G01N 30/02* | (2006.01) |

(52) U.S. Cl.

CPC ............. *G01N 30/34* (2013.01); *G01N 30/46* (2013.01); *G01N 30/7233* (2013.01); *G01N 2030/027* (2013.01)

(58) Field of Classification Search

CPC ................. G01N 30/461; G01N 30/82; G01N 2030/001–96; B01D 15/1864; B01D 15/247

USPC ............. 73/23.2, 23.35–23.37, 23.41–23.42, 73/61.52, 61.55, 61.56; 422/70, 89; 210/656–694; 95/82–89; 97/101–107

See application file for complete search history.

(56) References Cited

FOREIGN PATENT DOCUMENTS

| | | | | |
|---|---|---|---|---|
| JP | 2009509141 A * | 3/2009 | ............. | G01N 30/96 |
| WO | 2020/080041 A1 | 4/2020 | | |

OTHER PUBLICATIONS

Written Opinion or corresponding International Application No. PCT/JP2022/040256 dated Jan. 10, 2023.

* cited by examiner 100
110
CONTROLLER
120
121
MOBILE PHASE SUPPLIER
122
SAMPLE SUPPLIER
123
SEPARATION COLUMN
124
DETECTOR
130
DETECTOR
150
151
DILUENT PRODUCER
152
LIQUID SENDER
160
161
LIQUID SENDER
162
DETECTOR
163
FRACTION COLLECTOR
140
141
142
143
144
145
10
11
12
13
14
15
16
20
21
22
23
24
25
26
30
31
32
33
34
35
36
40
41
42
43
44
45
46
47

100
CONTROLLER
110
MOBILE PHASE SUPPLIER
121
SAMPLE SUPPLIER
122
SEPARATION COLUMN
123
DETECTOR
124
120
DILUENT PRODUCER
151
LIQUID SENDER
152
150
DETECTOR
130
FRACTION COLLECTOR
163
160
SAMPLE SUPPLIER
173
SEPARATION COLUMN
171
170
DETECTOR
172
DETECTOR
162
LIQUID SENDER
161
10
11
12
13
14
15
16
20
21
22
23
24
25
26
30
31
32
33
34
35
36
40
41
42
43
44
45
46
47
140
141
142
143
144
145

100
110
CONTROLLER
121
MOBILE PHASE SUPPLIER
122
SAMPLE SUPPLIER
123
SEPARATION COLUMN
124
DETECTOR
120
130
DETECTOR
150
151
DILUENT PRODUCER
152
LIQUID SENDER
10
11
12
13
14
15
16
20
21
22
23
24
25
26
30
31
32
33
34
35
36
40
41
42
43
44
45
46
47
140
141
142
143
144
145
160
161
LIQUID SENDER
162
DETECTOR
163
FRACTION COLLECTOR
170
171
SEPARATION COLUMN
172
DETECTOR
173
SAMPLE SUPPLIER 100
110
CONTROLLER
121
MOBILE PHASE SUPPLIER
122
SAMPLE SUPPLIER
123
SEPARATION COLUMN
124
DETECTOR
120
130
DETECTOR
151
DILUENT PRODUCER
152
LIQUID SENDER
150
160
163
FRACTION COLLECTOR
161
LIQUID SENDER
162
DETECTOR
170
171
SEPARATION COLUMN
172
DETECTOR
173
SAMPLE SUPPLIER
10
20
30
40
50
140
141
142
143
144
145

PREPARATIVE SYSTEM

TECHNICAL FIELD

The present invention relates to a preparative system.

BACKGROUND ART

A preparative system that separates a sample into components using an LC (Liquid Chromatograph) and fractionates and collects the components into which the sample has been separated has been known. For example, in a liquid chromatography preparative system described in Patent Document 1, a sample injected into an analysis flow path is transferred to a separation column by a mobile phase. The components into which the sample has been separated are eluted from the separation column and detected by a detector. Based on a signal provided by the detector in the analysis flow path, an eluent including a desired target component is collected by a sample loop.

After collection of the target component in the sample loop is completed, a solvent is supplied to the sample loop. Thus, the collected target component is introduced into a second-dimensional flow path and detected by the detector. Based on the signal provided by the detector in the second-dimensional flow path, the target component is fractionated and collected in a predetermined container by a fraction collector.

Further, an MS (Mass Spectrometer) may be used as a detector for detecting an eluent eluted from the separation column. For example, in a preparative LCMS system described in Patent Document 2, a portion of an eluent eluted from the separation column is introduced into an MS together with a mobile phase sent by a make-up pump. Based on a detection signal provided by the MS, the eluent eluted from the separation column is fractionated and collected in a predetermined container by a fraction collector.

[Patent Document 1] WO 2020/080041 A1

[Patent Document 2] JP 2005-241580 A

SUMMARY OF INVENTION

Technical Problem

In a preparative system, it may be required that an MS is provided as a detector of an analysis flow path. However, when the MS of Patent Document 2 is provided in the liquid chromatography preparative system of Patent Document 1, a make-up pump needs to be added. Therefore, the size and the cost of the liquid chromatography preparative system are increased.

An object of the present invention is to provide a preparative system the size and cost of which are prevented from being increased.

Solution to Problem

One aspect of the present invention relates to a preparative system that includes a mobile phase supplier that supplies a first mobile phase, a first sample supplier that supplies a sample to the first mobile phase supplied by the mobile phase supplier, a first separation column through which the sample supplied by the first sample supplier passes through, a first detector that detects the sample that has passed through the first separation column, a trap column that collects components of the sample that has passed through the first separation column based on a detection result provided by the first detector, and a liquid sender that supplies a make-up solution to the first detector and supplies an eluent for eluting the sample to the trap column.

Advantageous Effects of Invention

With the present invention, it is possible to prevent an increase in size and an increase in cost of a preparative system.

DESCRIPTION OF EMBODIMENTS

<1> First Embodiment

(1) Configuration of Preparative System

Figure 1:
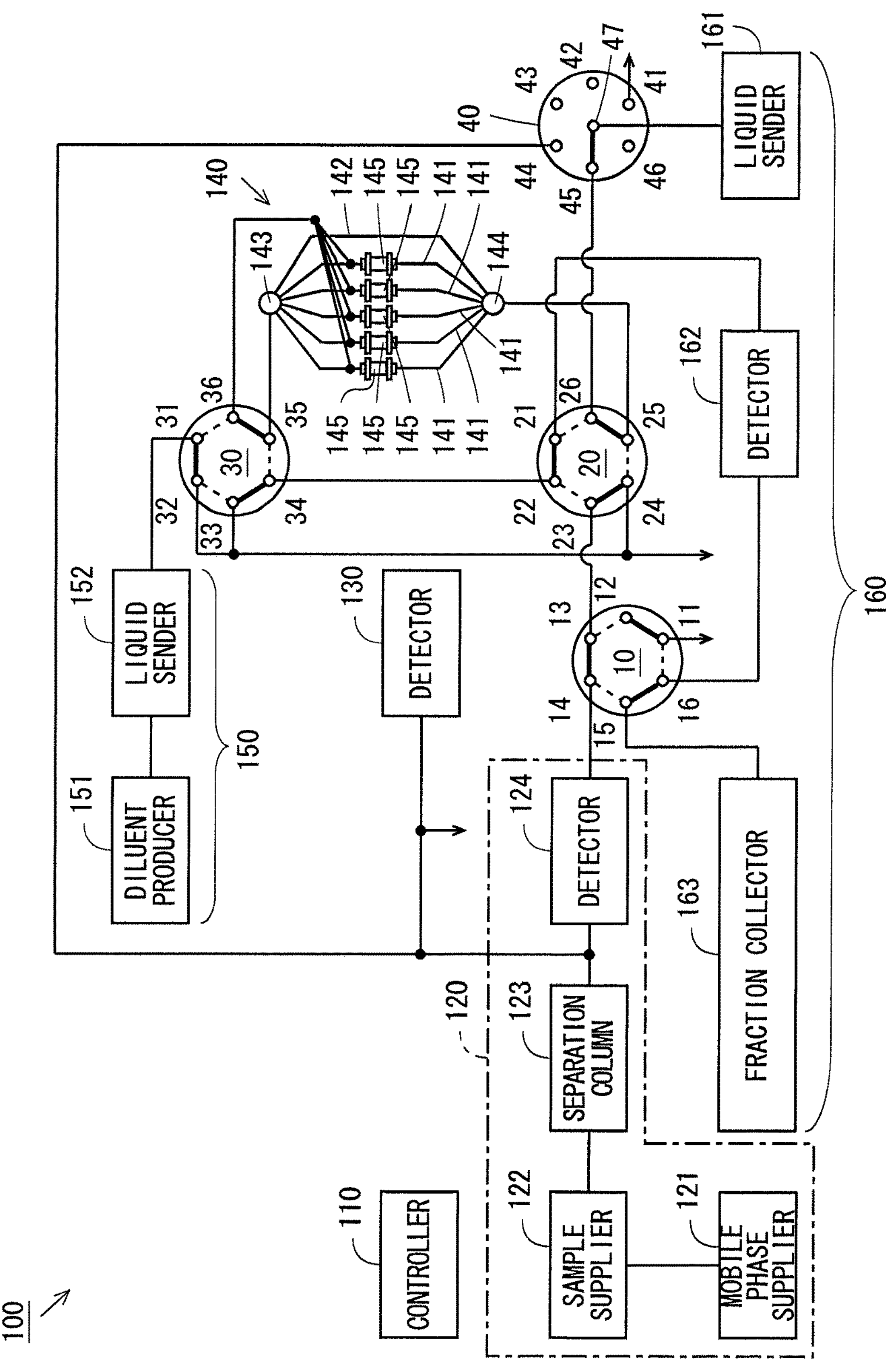
FIG. 1 is a diagram showing the configuration of a preparative system according to a first embodiment of the present invention.

A preparative system according to embodiments of the present invention will be described below in detail with reference to the drawings. FIG. 1 is a diagram showing the configuration of the preparative system according to a first embodiment of the present invention. As shown in FIG. 1, the preparative system 100 includes a controller 110, a separator 120, a detector 130, a collector 140, a diluter 150 and a recoverer 160. Further, the preparative system 100 includes a plurality of flow-path switchers 10, 20, 30, 40 that suitably connect the separator 120, the detector 130, the collector 140, the diluter 150 and the recoverer 160 to one another.

The controller 110 includes a CPU (Central Processing Unit) and a memory, or a microcomputer, for example. The controller 110 controls the operation of each component of the preparative system 100 based on a predetermined detection result obtained in the separator 120, the detector 130 or the recoverer 160. Further, the controller 110 executes a data process such as chromatogram production or the like based on the predetermined detection result obtained in the separator 120, the detector 130 or the recoverer 160.

The separator 120 is a liquid chromatograph (LC), for example, and includes a mobile phase supplier 121, a sample supplier 122, a separation column 123 and a detector 124. In the present example, the mobile phase supplier 121 includes two liquid sending pumps and a gradient mixer (not shown), and sends a mobile phase in a gradient. The sample supplier 122 is provided in a liquid handler, for example, and introduces a sample to be analyzed into the separation column 123 together with a mobile phase supplied by the mobile phase supplier 121.

The separation column 123 is contained in a column oven (not shown) and separates the introduced sample into components according to the differences in chemical property or composition. The detector 124 is a PDA (photodiode array) or a UV (ultraviolet) detector, for example. The flow path located at a farther downstream than the separation column 123 is branched into two paths. The detector 124 is provided in one flow path and at a position farther downstream than the separation column 123 and detects the components into which the sample has been separated by the separation column 123.

The detector 130 is provided in the other flow path and at a position farther downstream than the detector 124 of the separator 120. In the present example, the detector 130 is a mass spectrometer, and detects the sample components by performing mass spectrometry of an ionized sample. A make-up solution for improving the transport efficiency of the sample, the ionization efficiency of the sample or the sensitivity of the detector 130 is introduced into the detector 130 together with the sample.

The collector 140 includes a plurality of collection flow paths 141, a bypass flow path 142, flow-path switchers 143, 144 and trap columns 145. The plurality (five in the present example) of collection flow paths 141 and the bypass flow path 142 connect the flow-path switcher 143 and the flow-path switcher 144 to each other in parallel. Each of the flow-path switchers 143, 144 is a multi-way switching valve, for example, and selectively switches the flow path located between the flow-path switchers 143, 144, among the plurality of collection flow paths 141 and the bypass flow path 142. The plurality of trap columns 145 are provided in the collection flow paths 141, respectively, and each trap column 145 adsorbs sample components that have been introduced into the corresponding collection flow path 141.

The diluter 150 includes a diluent producer 151 and a liquid sender 152. The diluent producer 151 produces a diluent for improving collection efficiency for a sample in a trap column 145 in the collector 140. The liquid sender 152 is a liquid sending pump, for example, and pumps the diluent produced by the diluent producer 151 to each trap column 145.

The recoverer 160 includes a liquid sender 161, a detector 162 and a fraction collector 163. The liquid sender 161 is a liquid sending pump, for example, and pumps a makeup solution to the detector 130 during a first-dimensional operation, described below. Further, during a second-dimensional operation, described below, the detector 162 pumps an eluent for leading sample components collected in the trap column 145 of the collector 140 to the collector 140. The detector 162 is a PDA or a UV detector, for example, and detects the sample components led out from the trap column 145. The fraction collector 163 recovers the sample components detected by the detector 162 into a predetermined container (a test tube in the present example).

The flow-path switchers 10, 20, 30, 40 are multi-way switch valves, for example. The flow-path switcher 10 has six ports 11 to 16 and is switchable between a first connection state and a second connection state. In the first connection state, the ports 11, 12 are connected to each other, the ports 13, 14 are connected to each other, and the ports 15, 16 are connected to each other. In the second connection state, the ports 12, 13 are connected to each other, the ports 14, 15 are connected to each other, and the ports 16, 11 are connected to each other.

The flow-path switcher 20 has 6 ports 21 to 26. The flow-path switcher 30 has 6 ports 31 to 36. The configuration of each of the flow-path switchers 20, 30 is similar to the configuration of the flow-path switcher 10. Therefore, each of the flow-path switchers 20, 30 is switchable between the first connection state and the second connection state. The flow-path switcher 40 has 7 ports 41 to 47. The port 47 is selectively connected to any one of the ports 41 to 46.

In the flow-path switcher 10, the port 11 is connected to a liquid drain (not shown). The port 13 is connected to the port 23 of the flow-path switcher 20. The port 14 is connected to the downstream end portion of the detector 124 of the separator 120. The port 15 is connected to the fraction collector 163 of the recoverer 160. The port 16 is connected to the downstream end portion of the detector 162 of the recoverer 160.

In the flow-path switcher 20, the port 21 is connected to the upstream end portion of the detector 162 of the recoverer 160. The port 22 is connected to the port 34 of the flow-path switcher 30. The port 23 is connected to the port 13 of the flow-path switcher 10 as described above. The port 24 is connected to the liquid drain. The port 25 is connected to the flow-path switcher 144 of the collector 140. The port 26 is connected to the port 45 of the flow-path switcher 40.

In the flow-path switcher 30, the port 31 is connected to the liquid sender 152 of the diluter 150. The ports 32, 33 are connected to the liquid drain. The port 34 is connected to the port 22 of the flow-path switcher 20 as described above. The port 35 is connected to the flow-path switcher 143 of the collector 140. The port 36 is connected to each trap column 145 of the collector 140.

In the flow-path switcher 40, the port 41 is connected to the liquid drain. The port 44 is connected to the downstream end portion of the detector 130. The port 45 is connected to the port 26 of the flow-path switcher 20 as described above. The port 47 is connected to the liquid sender 161 of the recoverer 160. In the present embodiment, the ports 42, 43, 46 are not connected to anything.

(2) Operation of Preparative System

Figure 2:
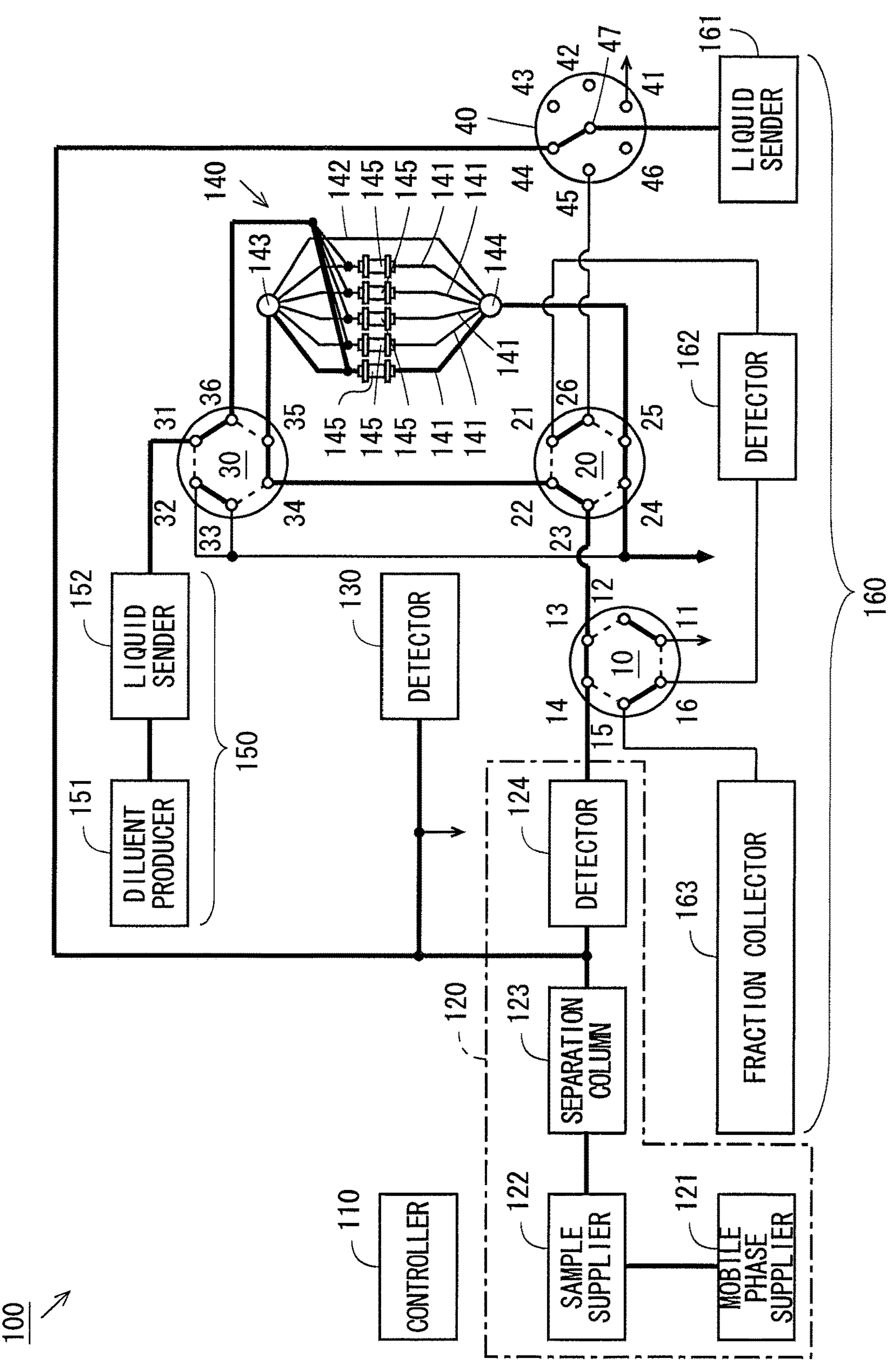
FIG. 2 is a diagram for explaining a first-dimensional operation of the preparative system of FIG. 1.

The preparative system 100 selectively performs the first-dimensional operation and the second-dimensional operation. FIG. 2 is a diagram for explaining the first-dimensional operation of the preparative system 100 of FIG. 1. As shown in FIG. 2, during the first-dimensional operation, the flow-path switcher 10 is in the first connection state, and each of the flow-path switchers 20, 30 is in the second connection state. In the flow-path switcher 40, the port 44 and the port 47 are connected to each other. Thus, the flow path indicated by the thick solid lines in FIG. 2 is formed.

In the first-dimensional operation, a mobile phase is supplied by the mobile phase supplier 121 in the separator 120. Further, the sample supplier 122 picks up a sample to be analyzed from any vial held by a tray (not shown), and supplies the sample to the flow path of the separator 120. The supplied sample is introduced into the separation column 123 together with the mobile phase, and separated into components. The sample that has been separated into components is partially introduced into the detector 124 together with the mobile phase. Thus, the components into which the sample has been separated are detected by the detector 124. The mobile phase including sample components are led out from the downstream end portion of the detector 124.

Further, a make-up solution is supplied through the ports 47, 44 of the flow-path switcher 40 by the liquid sender 161 of the recoverer 160. Another portion of components into which the sample has been separated by the separation column 123 is introduced into the detector 130 together with the makeup solution supplied by the liquid sender 161. Thus, the components into which the sample has been separated are detected by the detector 130.

The mobile phase including the sample components led out from the downstream end portion of the detector 124 is introduced into the collector 140 through the ports 14, 13 of the flow-path switcher 10, the ports 23, 22 of the flow-path switcher 20 and the ports 34, 35 of the flow-path switcher 30. Further, the diluent produced by the diluent producer 151 of the diluter 150 is introduced into each trap column 145 of the collector 140 by the liquid sender 152.

In the collector 140, based on a detection result provided by the detector 124 or the detector 130, the flow path between the flow-path switchers 143, 144 is selectively switched to any one of the plurality of collection flow paths 141 and the bypass flow path 142. Specifically, in a period during which a mobile phase not including sample components is introduced into the collector 140, the flow path between the flow-path switchers 143, 144 is switched to the bypass flow path 142. In this case, the mobile phase introduced into the collector 140 is discharged to the liquid drain through the ports 25, 24 of the flow-path switcher 20.

On the other hand, in a period during which a mobile phase including any sample components is introduced into the collector 140, the flow path between the flow-path switchers 143, 144 is switched to any one of the plurality of collection flow paths 141. Further, as described above, the diluent is introduced into each trap column 145. Therefore, the sample components included in the introduced mobile phase are collected in the trap column 145 of the collection flow path 141. Further, the mobile phase that has passed through the collection flow path 141 is discharged to the liquid drain through the ports 25, 24 of the flow-path switcher 20. The flow path is switched as described above each time a mobile phase including sample components are introduced into the collector 140.

Figure 3:
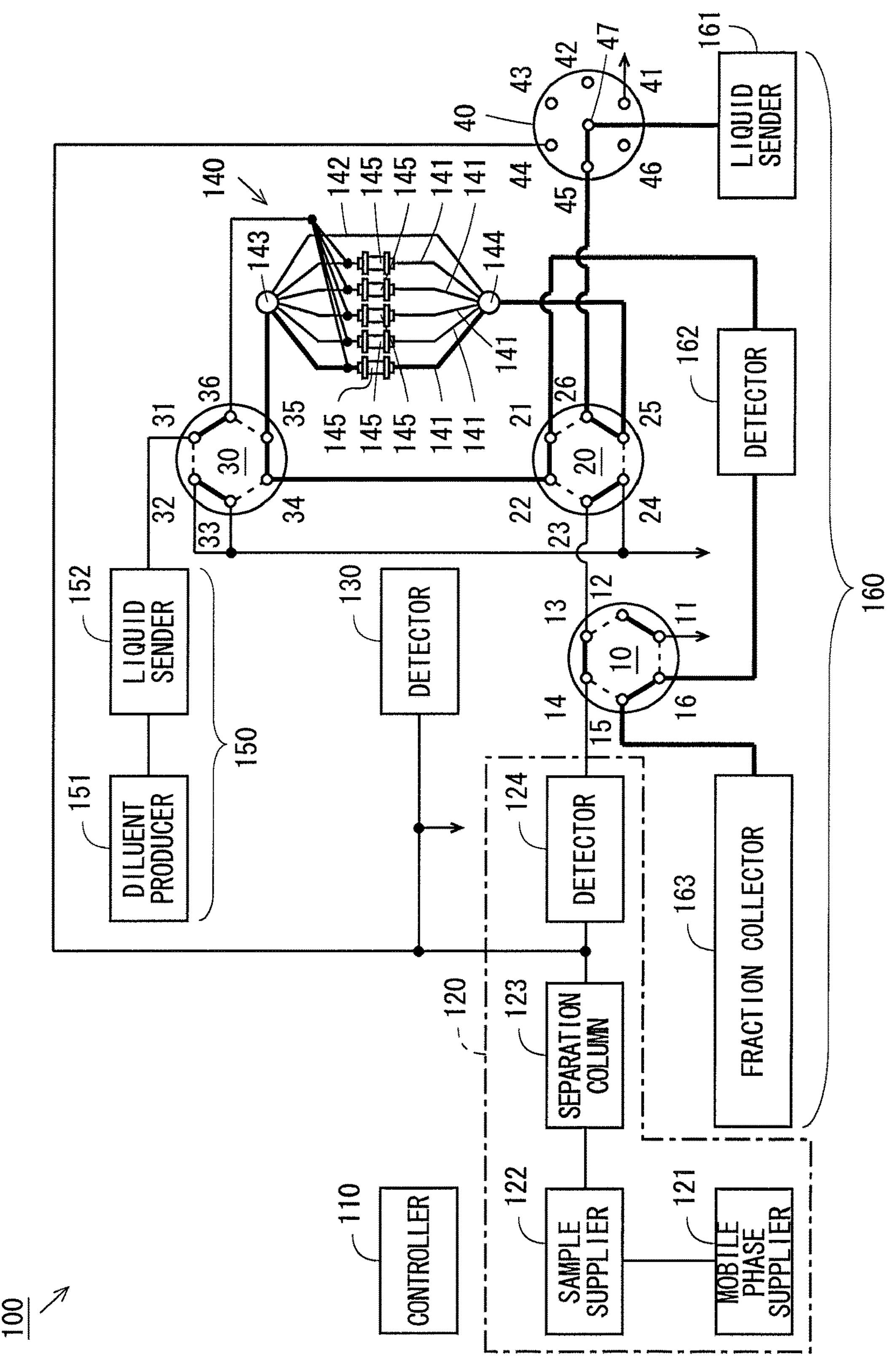
FIG. 3 is a diagram for explaining a second-dimensional operation of the preparative system of FIG. 1.

FIG. 3 is a diagram for explaining the second-dimensional operation of the preparative system 100 of FIG. 1. As shown in FIG. 3, during the second-dimensional operation, each of the flow-path switchers 10, 20, 30 is in the first connection state. In the flow-path switcher 40, the port 45 and the port 47 are connected to each other. Thus, the flow path indicated by the thick solid lines in FIG. 3 is formed.

In the second-dimensional operation, an eluent is introduced into the collector 140 through the ports 47, 45 of the flow-path switcher 40 and the ports 26, 25 of the flow-path switcher 20 by the liquid sender 161 of the recoverer 160. In the collector 140, the flow path between the flow-path switchers 143, 144 is switched to any one of the plurality of collection flow paths 141. The sample components collected in the trap column 145 of the collection flow path 141 are eluted by the eluent.

In the recoverer 160, the eluted sample components are introduced from the collection flow path 141 into the detector 162 together with the eluent through the ports 35, 34 of the flow-path switcher 30 and the ports 22, 21 of the flow-path switcher 20. Thus, the eluted sample components are detected by the detector 162. Further, based on a detection result provided by the detector 162, the fraction collector 163 recovers the sample components in any of a plurality of test tubes held in a tray (not shown). Each being detected by the detector 162, the sample components are recovered, as described above, using a different test tube.

While a diluent is not supplied to the collector 140 during the second-dimensional operation in the present embodiment, the embodiment is not limited to this. In a case in which components of an eluent introduced into the fraction collector 163 are adjusted, a diluent may be supplied from the diluter 150 to the collector 140 as necessary.

(3) Effects

In the preparative system 100 according to the present embodiment, a make-up solution is supplied to the detector 130, so that a sample that has passed through the separation column 123 is detected. Further, an eluent is supplied to the trap column 145, so that a sample collected in the trap column 145 is eluted. Because a makeup solution and an eluent are supplied by the common liquid sender 161, it is not necessary to separately provide a device for supplying a makeup solution and a device for supplying an eluent. This can prevent an increase in size and an increase in cost of the preparative system 100.

Further, the flow-path switcher 20 switches between a state in which the flow path between the trap column 145 and the separation column 123 is connected and a state in which the flow path between the trap column 145 and the liquid sender 161 is connected. Thus, it is possible, with a simple configuration, to selectively collect a sample that has passed through the separation column 123 using the trap column 145 and elute a sample collected in the trap column 145.

Further, the flow-path switcher 40 switches between a state in which the flow path between the liquid sender 161 and the detector 130 is connected and a state in which the flow path between the liquid sender 161 and the trap column 145 is connected. Thus, it is possible, with a simple configuration, to selectively supply a makeup solution to the detector 130 and supply an eluent to the trap column 145.

(4) Reference Example

Figure 4:
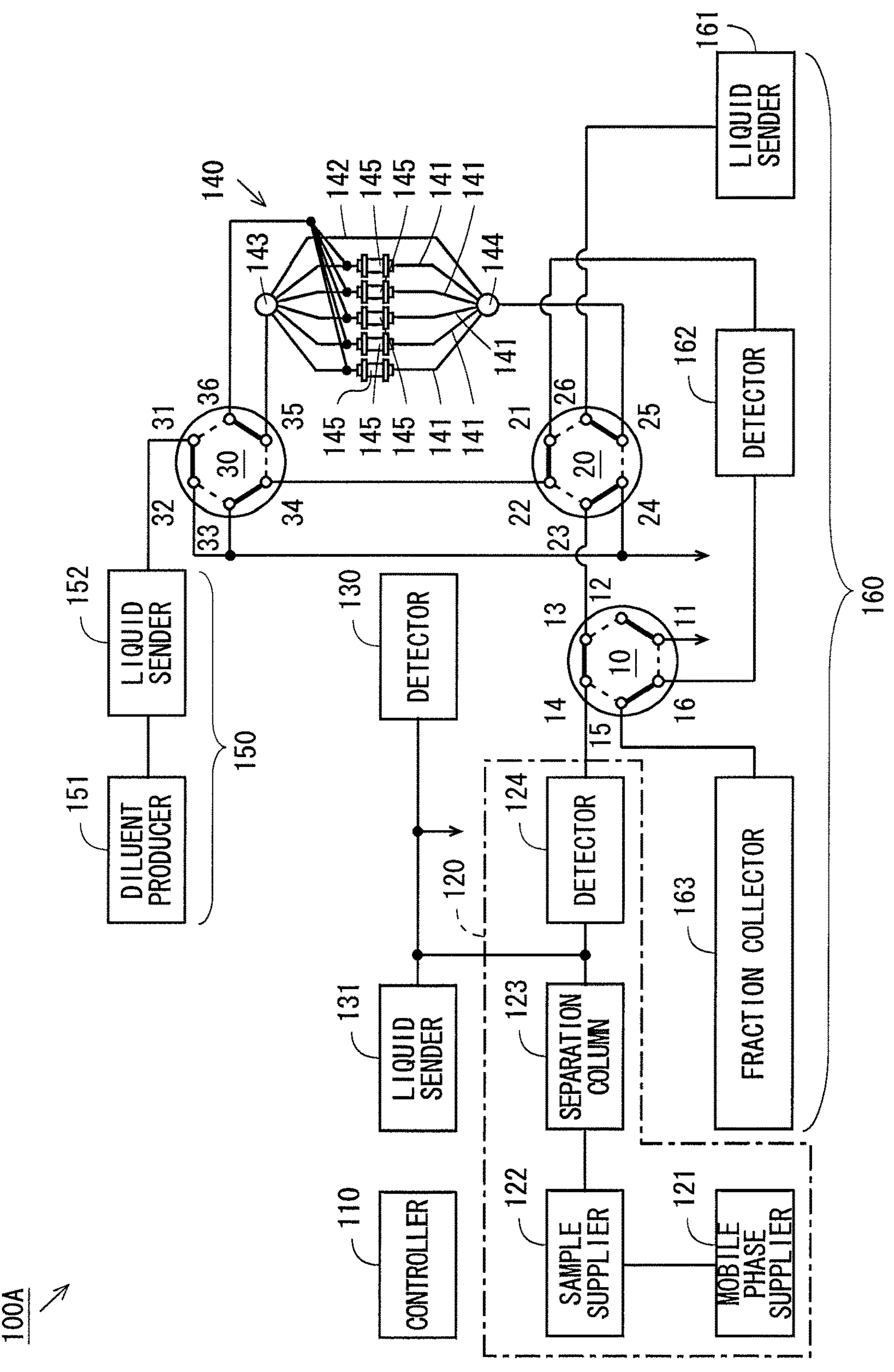
FIG. 4 is a diagram showing the configuration of a preparative system according to a reference example.

In regard to a preparative system according to a reference example, differences from the preparative system 100 according to the present embodiment will be described. FIG. 4 is a diagram showing the configuration of the preparative system according to the reference example. As shown in FIG. 4, the preparative system 100A includes a liquid sender 131 instead of the flow-path switcher 40. In this case, a liquid sender 161 of a recoverer 160 is connected to a port 26 of a flow-path switcher 20.

A liquid sender 131 is a liquid sending pump, for example, and supplies a makeup solution during a first-dimensional operation. In this case, one portion of a sample separated into components by a separation column 123 of a separator 120 is introduced into a detector 130 together with a makeup solution supplied by the liquid sender 131. Thus, the components into which the sample has been separated are detected by the detector 130.

The liquid sender 161 pumps an eluent during a second-dimensional operation. In this case, the eluent supplied by the liquid sender 161 is introduced into a collector 140 through ports 26, 25 of the flow-path switcher 20. Thus, the sample components collected in a trap column 145 of any one of collection flow paths 141 of a collector 140 are eluted by the eluent.

In this manner, also in the preparative system 100A according to the modified example, similarly to the preparative system 100 according to the present embodiment, the first-dimensional operation and the second-dimensional operation can be performed. However, with the configuration of the modified example, the liquid sender 131 is provided separately from the liquid sender 161. Therefore, as compared with the preparative system 100, the size and the cost of the preparative system 100A are increased.

<2> Second Embodiment

(1) Configuration of Preparative System

Figure 5:
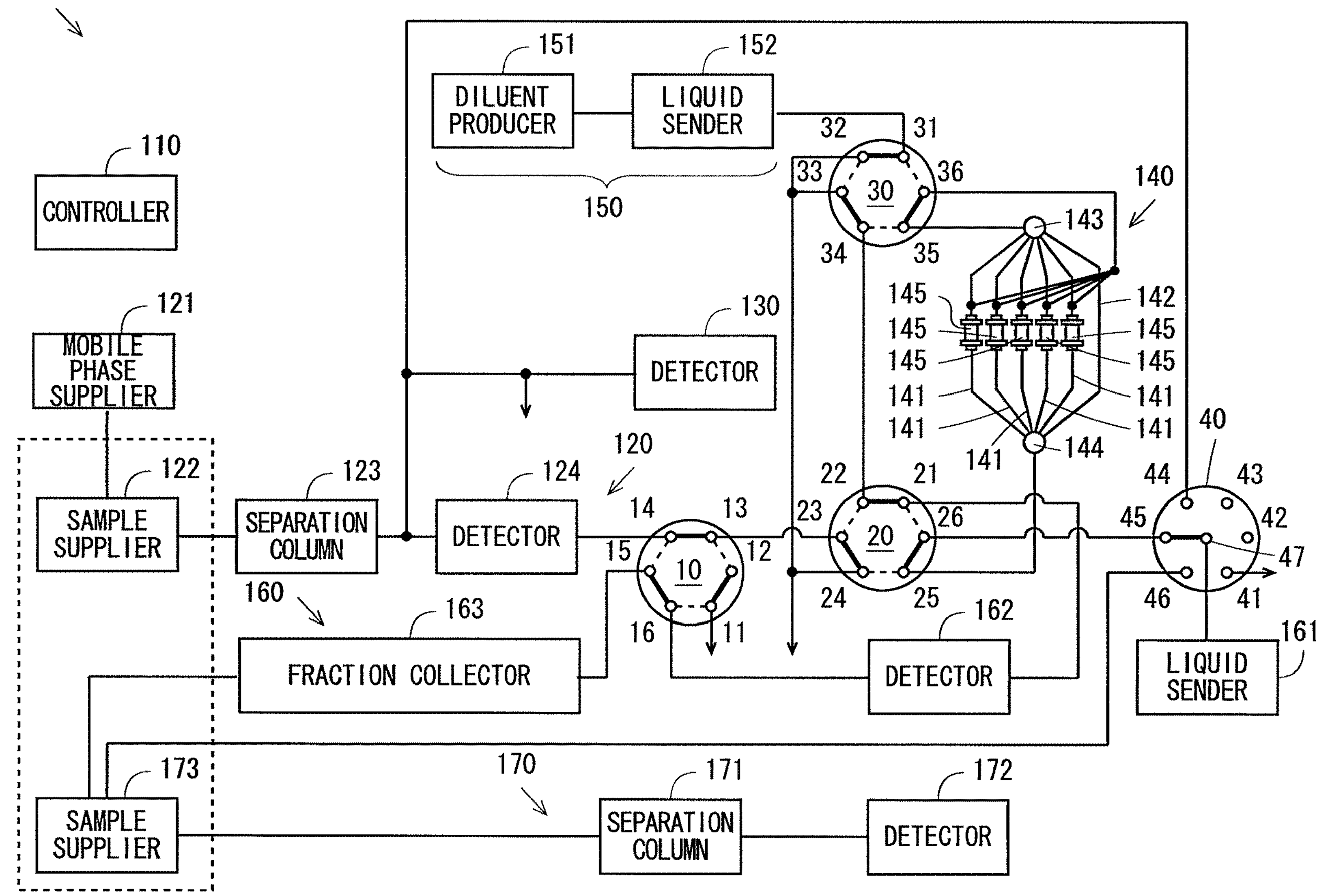
FIG. 5 is a diagram showing the configuration of a preparative system according to a second embodiment.

In regard to a preparative system 100 according to a second embodiment, differences from the preparative system 100 according to the first embodiment will be described. FIG. 5 is a diagram showing the configuration of the preparative system 100 according to the second embodiment. As shown in FIG. 5, the preparative system 100 further includes an analyzer 170. The analyzer 170 includes a separation column 171, a detector 172 and a sample supplier 173. The configurations of the separation column 171 and the detector 172 are respectively similar to those of the separation column 123 and the detector 124 of the separator 120. As indicated by the dotted lines in FIG. 5, in the present example, the sample supplier 173 is provided in the same liquid handler as that of the sample supplier 122.

Further, a port 46 of a flow-path switcher 40 is connected to a sample supplier 122 of a separator 120. A liquid sender 161 of a recoverer 160 supplies a mobile phase to the sample supplier 122 through ports 47, 46 of a flow-path switcher 40. Here, in the sample supplier 122, a tray for holding a plurality of vials and a plurality of test tubes are provided.

Figure 6:
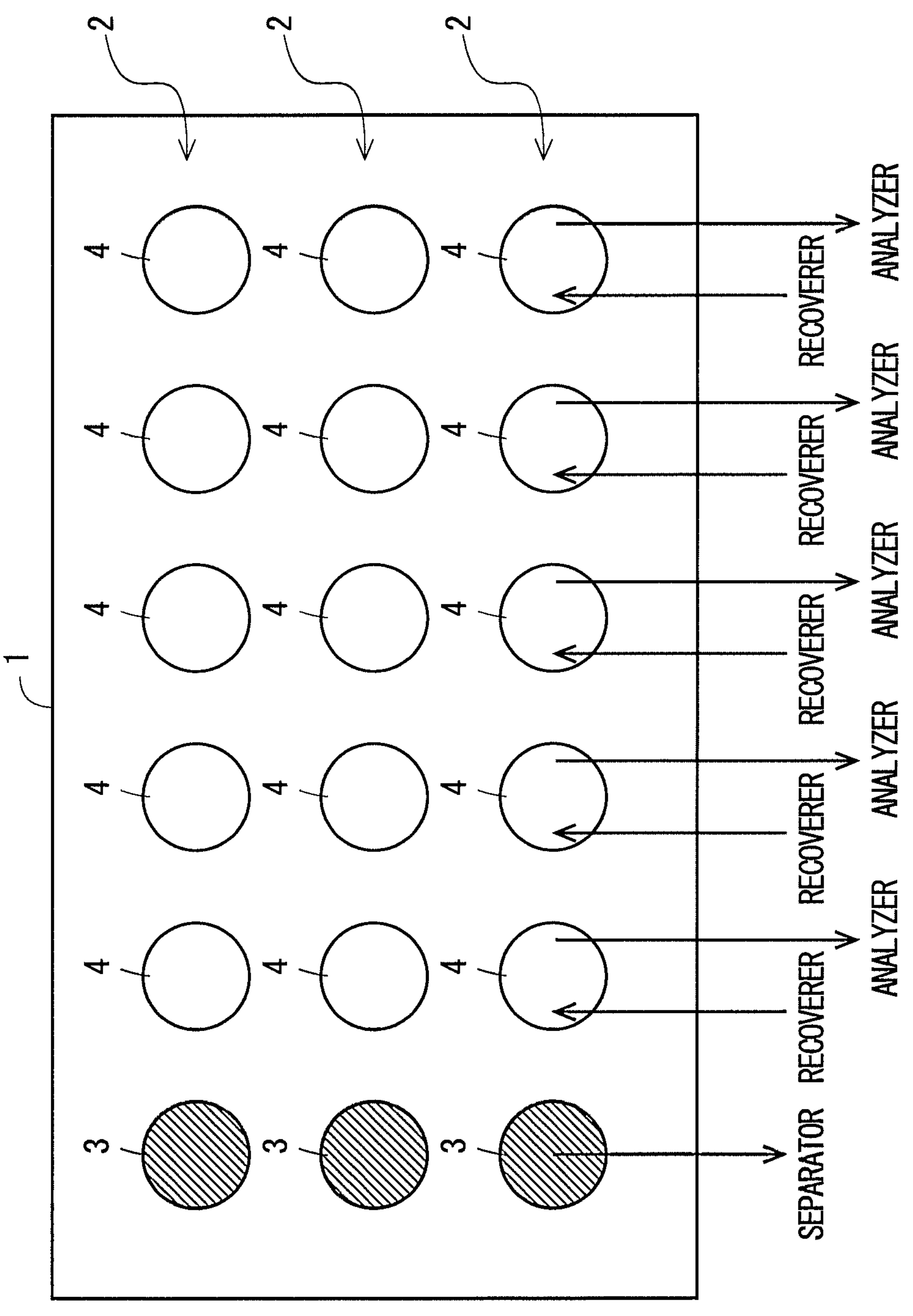
FIG. 6 is a plan view showing one example of a tray provided in a liquid handler.

FIG. 6 is a plan view showing one example of a tray provided in the liquid handler. As shown in FIG. 6, a plurality (three in the present example) of container sets 2 are held in the tray 1. Each container set 2 includes one vial 3 and a plurality of test tubes 4. The vial 3 contains a sample to be analyzed. The components into which a sample has been separated are recovered and contained in each test tube 4. Therefore, before a sample is separated, each test tube 4 is empty. The sample components contained in each test tube 4 are analyzed in the analyzer 170 for evaluation of the purity.

(2) Operation of Preparative System

The sample supplier 122 of the separator 120 picks up a sample from the vial 3 of any container set 2 placed on the tray 1 and supplies the sample to the flow path of the separator 120. In this state, the first-dimensional operation similar to that of the first embodiment is performed. The first-dimensional operation of the preparative system 100 in the present embodiment is similar to the first-dimensional operation of the preparative system 100 of FIG. 2 in the first embodiment. Thus, the sample is separated into components, and the components into which the sample has been separated are collected in any trap column 145 of the collector 140.

Figure 7:
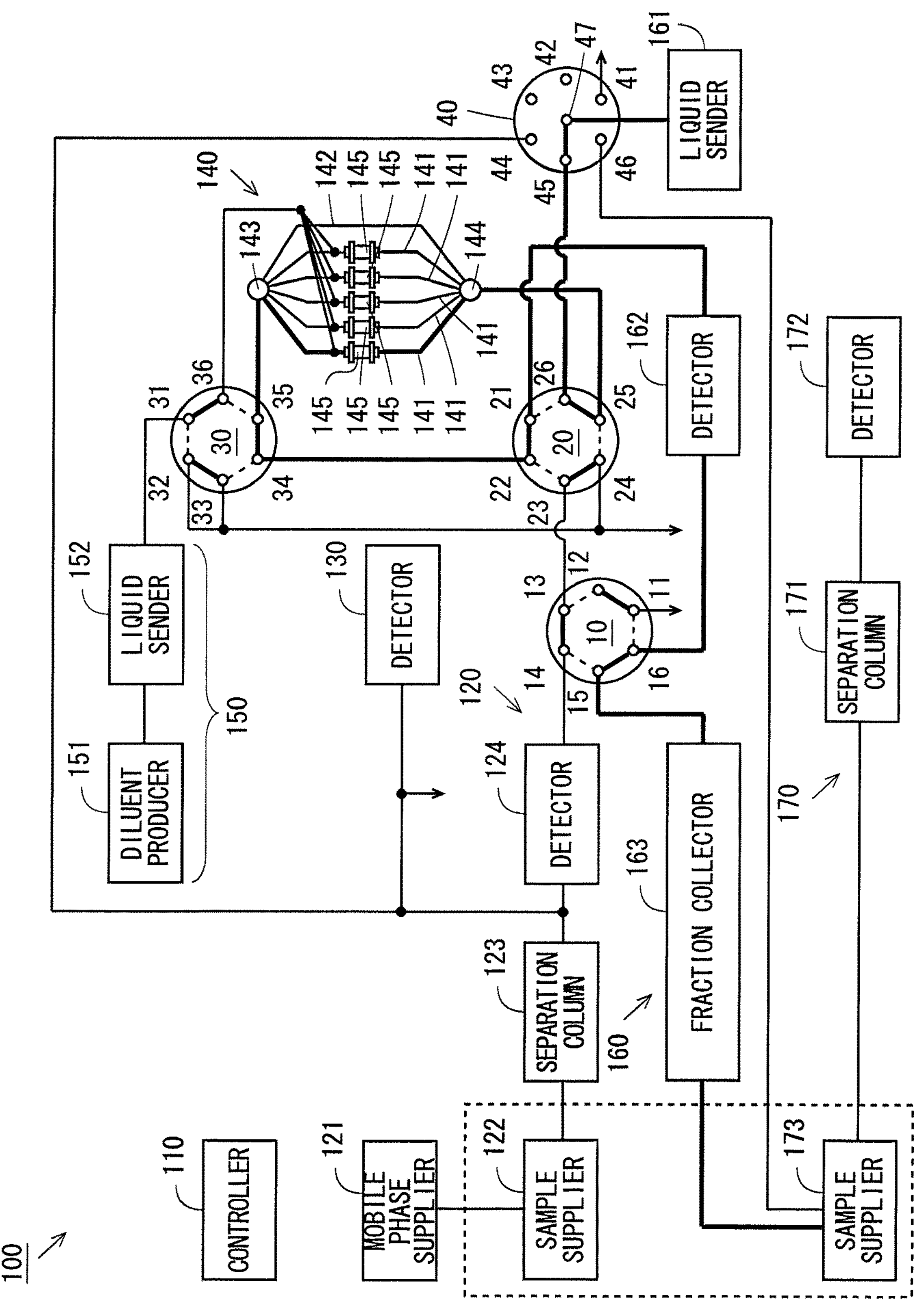
FIG. 7 is a diagram for explaining a second-dimensional operation of the preparative system of FIG. 5.

FIG. 7 is a diagram for explaining the second-dimensional operation of the preparative system 100 of FIG. 5. The second-dimensional operation of FIG. 7 is similar to the second-dimensional operation of the preparative system 100 of FIG. 3 in the first embodiment, and the flow path indicated by the thick solid lines in FIG. 7 is formed. Thus, the sample components collected in the trap column 145 are eluted.

Based on a detection result provided by a detector 162, a fraction collector 163 of the recoverer 160 recovers the sample components in a test tube 4. In the present example, the plurality of sample components contained in the vial 3 of each container set 2 are respectively recovered in the plurality of test tubes 4 in the same container set 2. Therefore, different sample components are respectively contained in the plurality of test tubes 4 in each container set 2.

Figure 8:
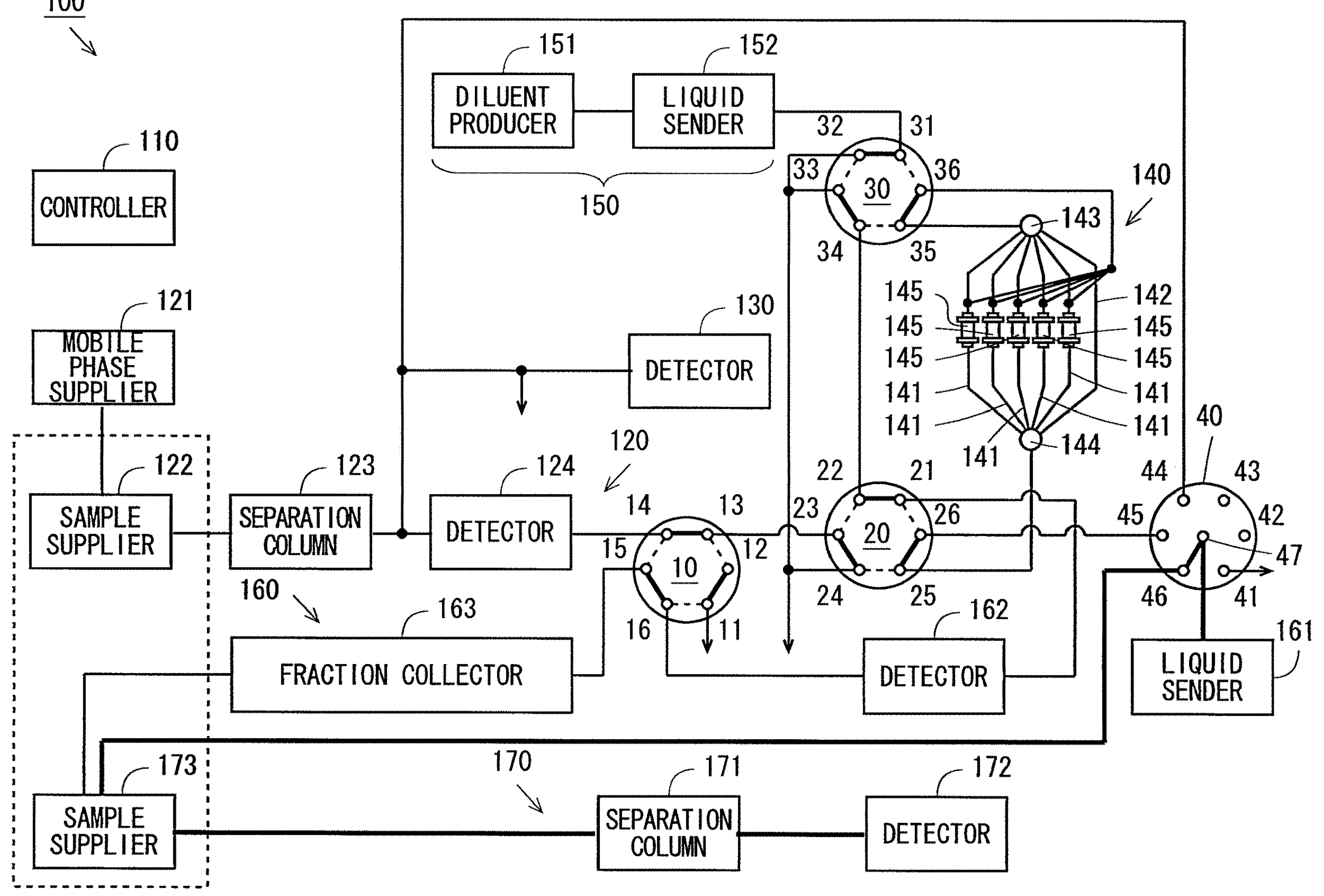
FIG. 8 is a diagram for explaining an operation of the preparative system of FIG. 5 during an analysis.

FIG. 8 is a diagram for explaining the operation of the preparative system 100 of FIG. 5 during an analysis. As shown in FIG. 8, after sample components are contained in a test tube 4, the port 46 and the port 47 are connected in the flow-path switcher 40. Thus, the flow path indicated by the thick solid lines in FIG. 8 is formed. In this state, in the recoverer 160, a mobile phase is supplied by the liquid sender 161. The mobile phase is introduced into the analyzer 170 through the ports 47, 46 of the flow-path switcher 40.

Further, the sample supplier 173 picks up a sample from any test tube 4 held on the tray 1, and supplies the sample to the flow path of the analyzer 170. The sample supplied to the flow path of the analyzer 170 is introduced into the separation column 171 together with a mobile phase and separated into components. The sample that has been separated into components is introduced into the detector 172 together with the mobile phase. Thus, the components into which the sample has been separated are detected by the detector 172. In the controller 110, the purity of the sample components contained in the test tube 4 is evaluated based on a detection result provided by the detector 172.

(3) Effects

In the preparative system 100 according to the present embodiment, a mobile phase is further supplied by the liquid sender 161. In the flow path of the analyzer 170, a sample recovered in the test tube 4 by the fraction collector 163 is supplied by the sample supplier 173 to the mobile phase supplied by the liquid sender 161. The sample supplied by the sample supplier 173 passes through the separation column 171. The sample that has passed through the separation column 171 is detected by the detector 172.

In this case, using a detection result provided by the detector 172, it is possible to evaluate the purity of the sample recovered in the test tube 4. Since the mobile phase is supplied by the liquid sender 161 that supplies a makeup solution and an eluent, it is not necessary to separately provide a device for supplying a mobile phase. This can prevent an increase in size and an increase in cost of the preparative system 100. Here, the connection state of the flow path is switched by the flow-path switcher 40. Therefore, it is possible, with a simple configuration, to supply a makeup solution, supply an eluent and supply a mobile phase.

Further, because the separation column 171 and the detector 172 are provided in the preparative system 100, after a sample is recovered in the test tube 4, an analysis for evaluation of the purity of the sample can be continuously and automatically performed in the same system. Therefore, a user does not need to transport the sample recovered in the test tube 4 to another analysis system. This improves the usability of the preparative system 100.

(4) First Modified Example

Figure 9:
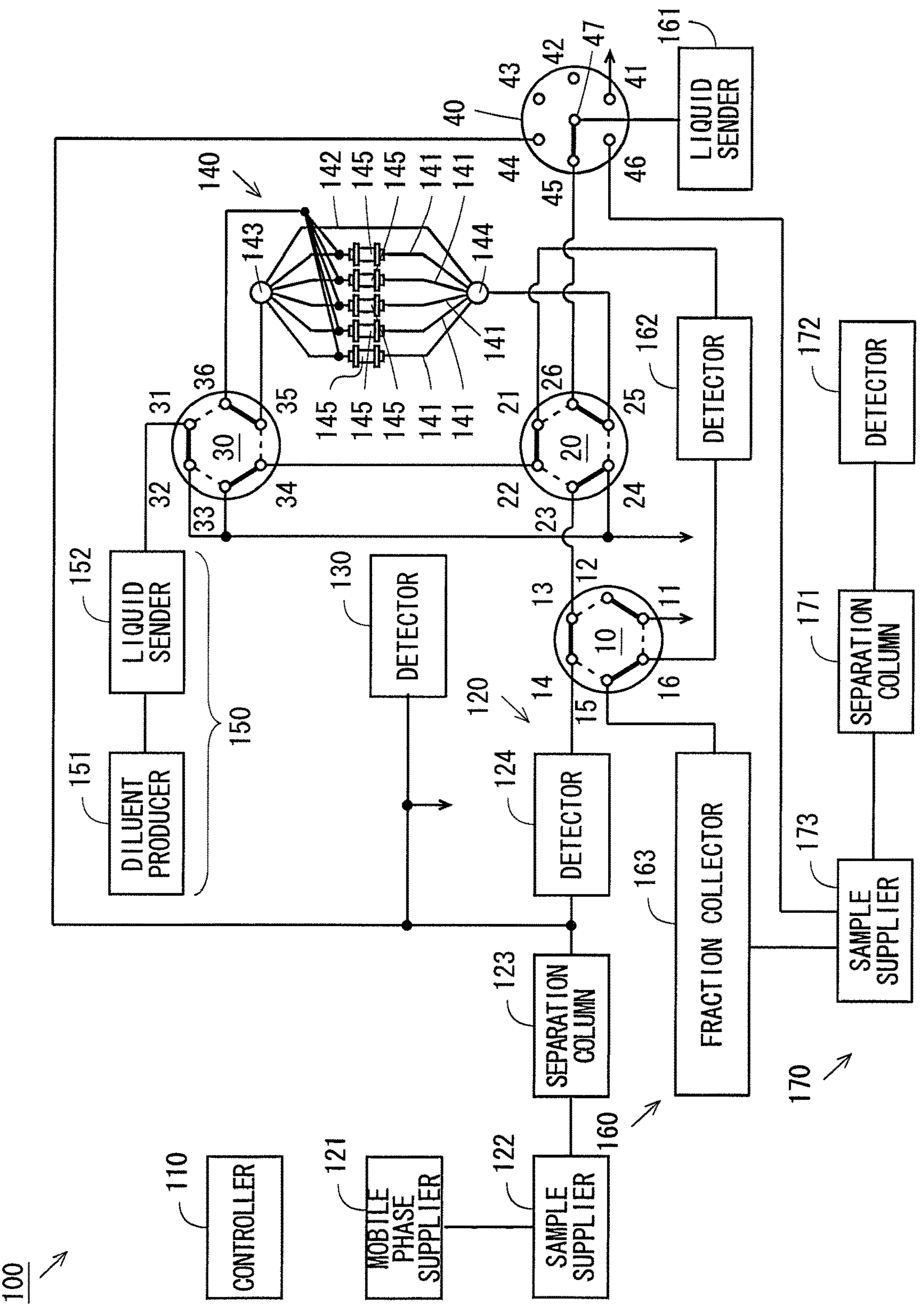
FIG. 9 is a diagram showing the configuration of a preparative system in a first modified example.

While the sample supplier 122 of the separator 120 and the sample supplier 173 of the analyzer 170 are provided in the same liquid handler in the present embodiment, the embodiment is not limited to this. FIG. 9 is a diagram showing the configuration of a preparative system 100 in a first modified example. As shown in FIG. 9, a sample supplier 122, and a sample supplier 173 of an analyzer 170 may be provided in separate devices. With this configuration, a vial containing a sample to be analyzed and a test tube containing a separated sample do not have to be held in the same tray.

<3> Third Embodiment (1) Configuration of Preparative System

Figure 10:
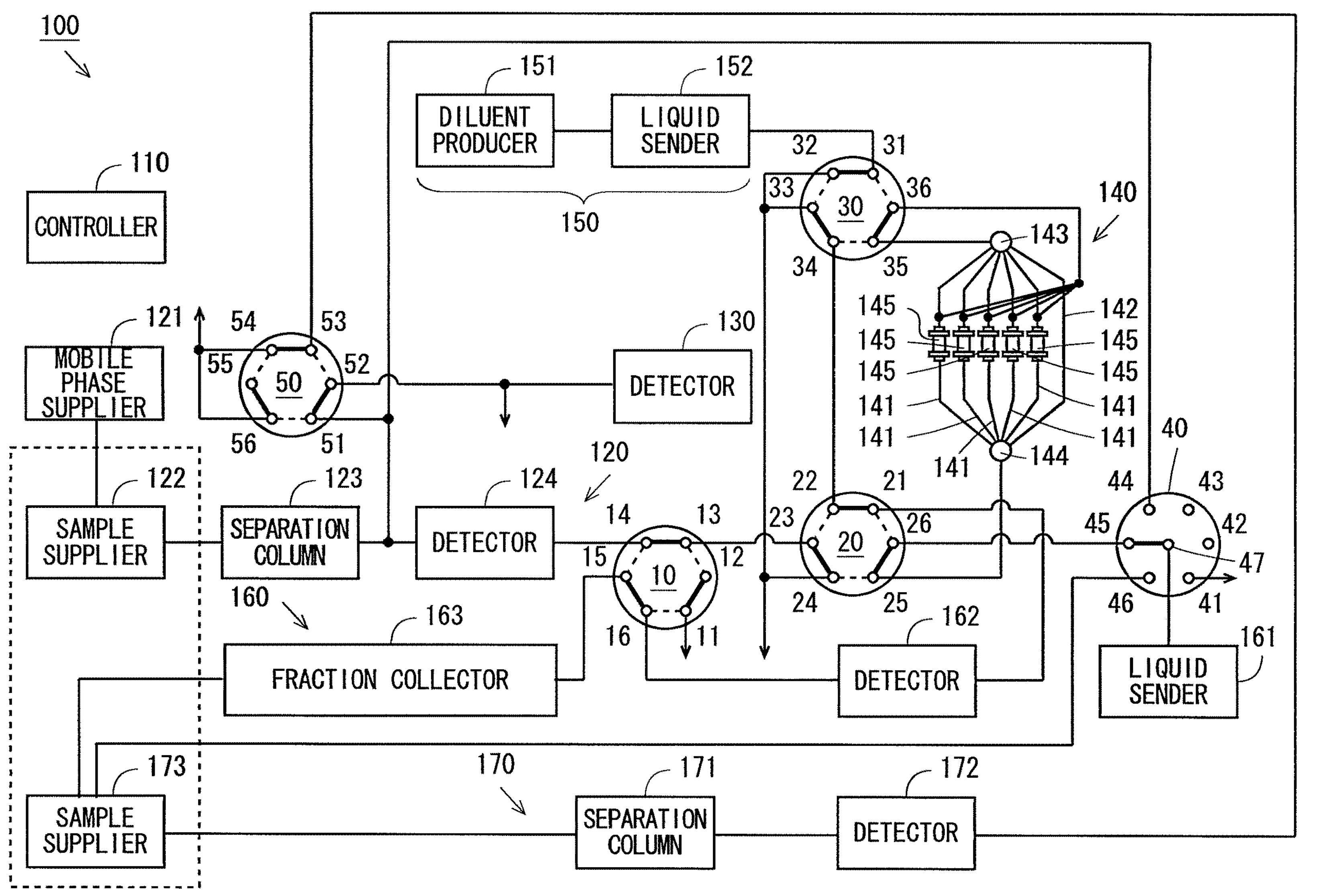
FIG. 10 is a diagram showing the configuration of a preparative system according to a third embodiment.

In regard to a preparative system 100 according to a third embodiment, differences from the preparative system 100 according to the second embodiment will be described. FIG. 10 is a diagram showing the configuration of the preparative system 100 according to the third embodiment. As shown in FIG. 10, the preparative system 100 further includes a flow-path switcher 50. The flow-path switcher 50 has 6 ports 51 to 56. The configuration of the flow-path switcher 50 is similar to the configuration of the flow-path switcher 10. Therefore, the flow-path switcher 50 is switchable between a first connection state and a second connection state.

In the flow-path switcher 50, the port 11 is connected to a port 44 of a flow-path switcher 40 and is also connected to the flow path between a separation column 123 and a detector 124 in a separator 120. The port 52 is connected to the upstream end portion of a detector 130. The port 53 is connected to the downstream end portion of a detector 172 of an analyzer 170. The ports 54, 56 are connected to a liquid drain.

(2) Operation of Preparative System

Figure 11:
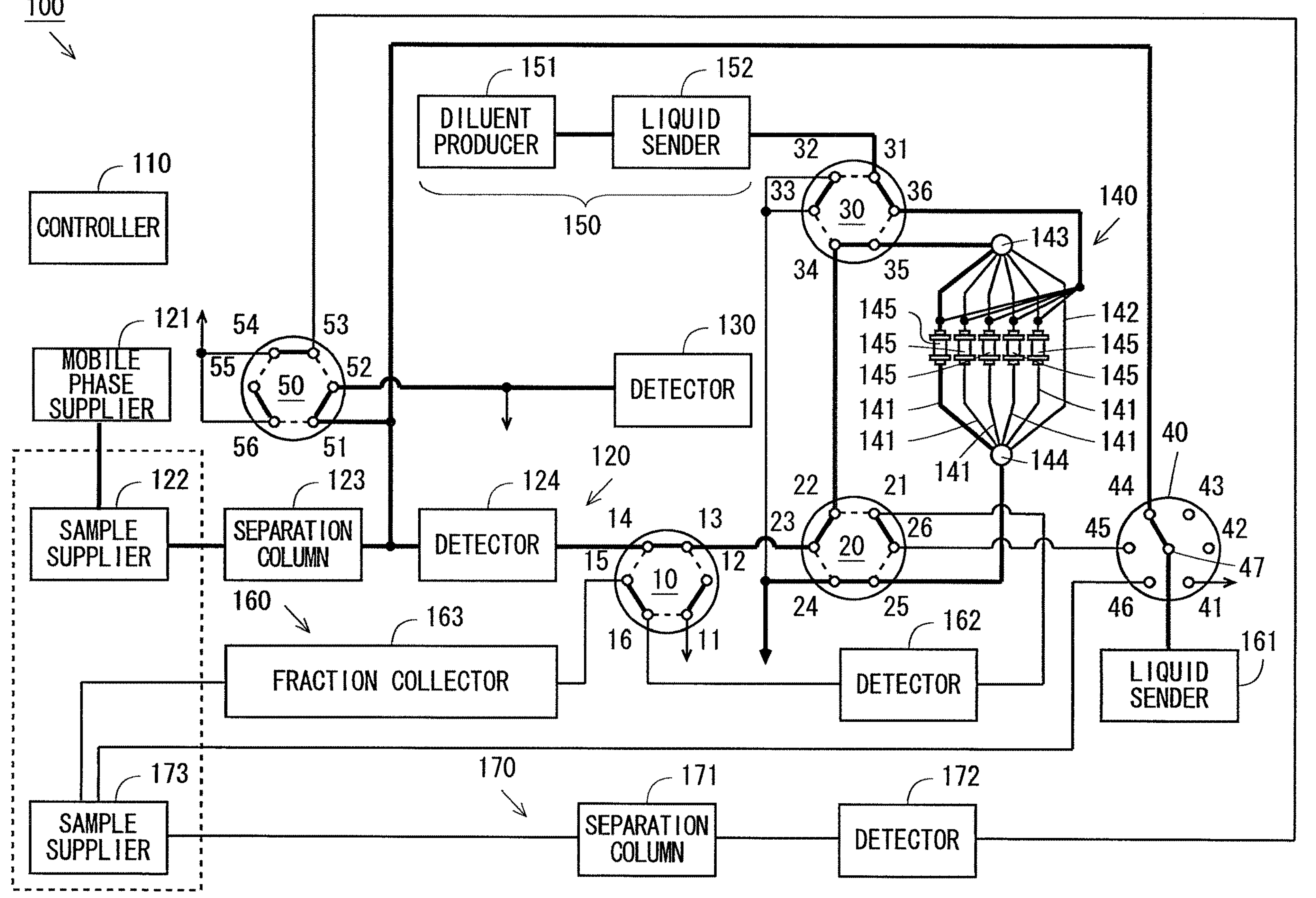
FIG. 11 is a diagram for explaining a first-dimensional operation of the preparative system of FIG. 10.

FIG. 11 is a diagram for explaining a first-dimensional operation of the preparative system 100 of FIG. 10. As shown in FIG. 11, except that the flow-path switcher 50 is in the first connection state, the first-dimensional operation in the present embodiment is similar to the second-dimensional operation of the preparative system 100 of FIG. 3 in the first embodiment. Therefore, the flow path indicated by the thick solid lines in FIG. 11 is formed. In this case, a sample is separated into components by the separator 120, and the components into which the sample has been separated are collected in any trap column 145 of a collector 140.

Here, in a recoverer 160, a makeup solution is supplied by a liquid sender 161. The makeup solution is introduced into ports 47, 44 of the flow-path switcher 40 and the port 51 of the flow-path switcher 50. Further, a portion of the sample separated into components by a separation column 123 of the separator 120 is introduced into the port 51 of the flow-path switcher 50. Therefore, a portion of the sample separated into components is introduced into the detector 130 through the ports 51, 52 of the flow-path switcher 50 together with the makeup solution. Thus, the components into which the sample has been separated are detected by the detector 130.

After the first-dimensional operation, a second-dimensional operation is performed. The second-dimensional operation of the preparative system 100 in the present embodiment is similar to the second-dimensional operation of the preparative system 100 of FIG. 7 in the second embodiment. Thus, the components into which the sample is separated are recovered and contained in any of test tubes 4 of a tray 1.

Figure 12:
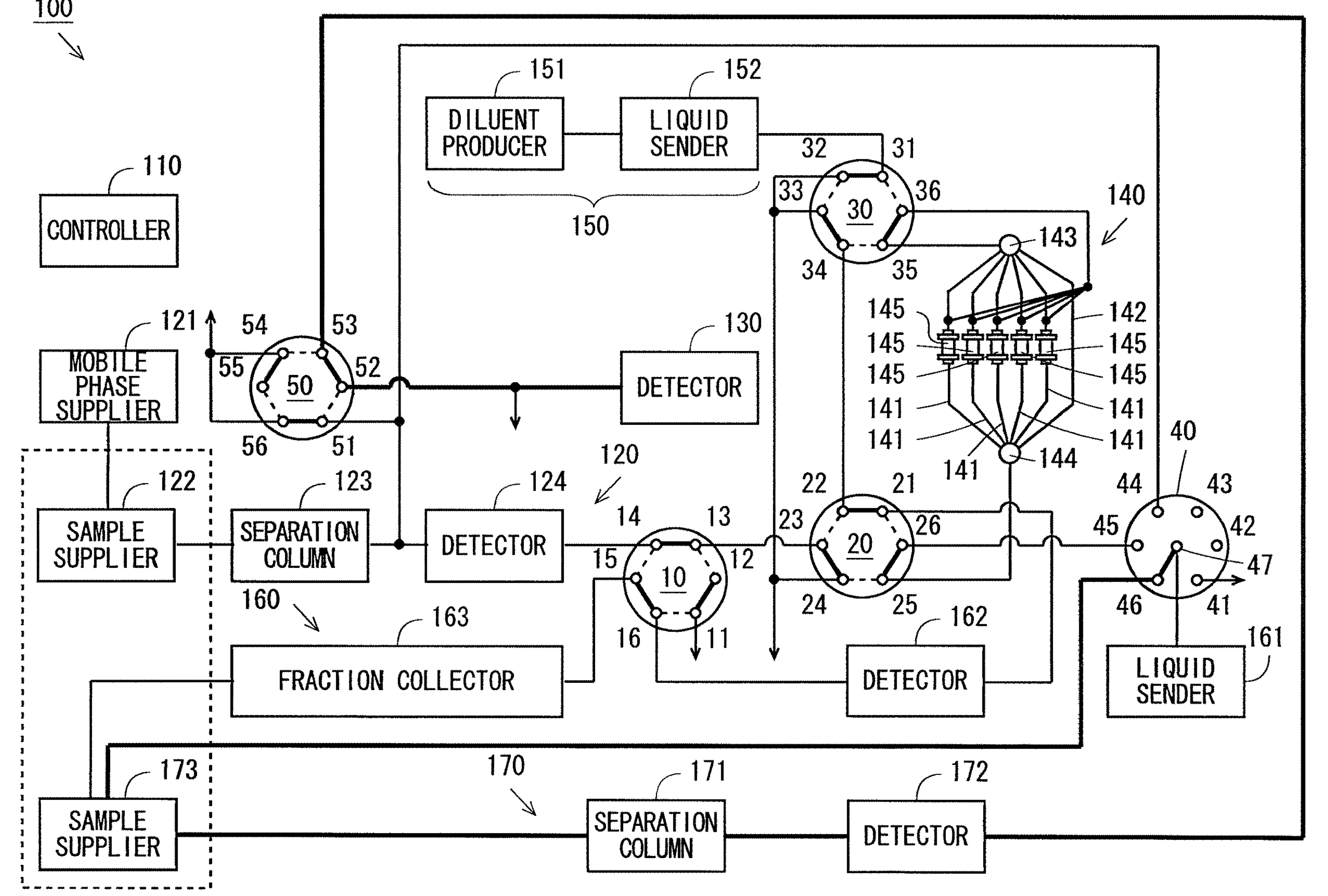
FIG. 12 is a diagram for explaining an operation of the preparative system of FIG. 10 during an analysis.

FIG. 12 is a diagram for explaining the operation of the preparative system 100 of FIG. 10 during an analysis. As shown in FIG. 12, the flow-path switcher 50 is in the second connection state during an analysis. In the flow-path switcher 40, the port 46 and the port 47 are connected to each other. Thus, the flow path indicated by the thick solid lines in FIG. 12 is formed. In this case, similarly to an operation of the preparative system 100 of FIG. 8 during an analysis in the second embodiment, a separated sample supplied by a sample supplier 173 are introduced into the analyzer 170 together with a mobile phase supplied by the liquid sender 161.

The mobile phase including the sample, which is led out from the downstream end portion of the detector 172 of the analyzer 170, is introduced into the detector 130 through the ports 53, 52 of the flow-path switcher 50. Thus, the introduced sample components are detected by the detector 130. In the controller 110, the purity of the sample components contained in the test tube 4 is evaluated in more detail based on a detection result provided by the detector 130.

(3) Effects

In the preparative system 100 according to the present embodiment, a sample that has passed through the separation column 171 and the detector 172 is detected by the common detector 130. In this case, based on a detection result provided by the detector 130, the sample that has passed through the separation column 171 can be analyzed in more detail.

With this configuration, it is not necessary to separately provide a detector for detecting a sample that has passed through the separation column 123 and a detector for detecting a sample that has passed through the separation column 171. This can prevent an increase in size and an increase in cost of the preparative system 100. Further, because it is not necessary to provide a plurality of relatively complicated detectors 130 such as mass spectrometers, the control software of the preparative system 100 is prevented from being complicated.

Further, a state in which the flow path between the separation column 123 and the detector 130 is connected and a state in which the flow path between the separation column 171 and the detector 130 is connected are switched by the flow-path switcher 50. Thus, it is possible, with a simple configuration, to selectively detect a sample that has passed through the separation column 123 and detect a sample that has passed through the separation column 171.

(4) Second Modified Example

Figure 13:
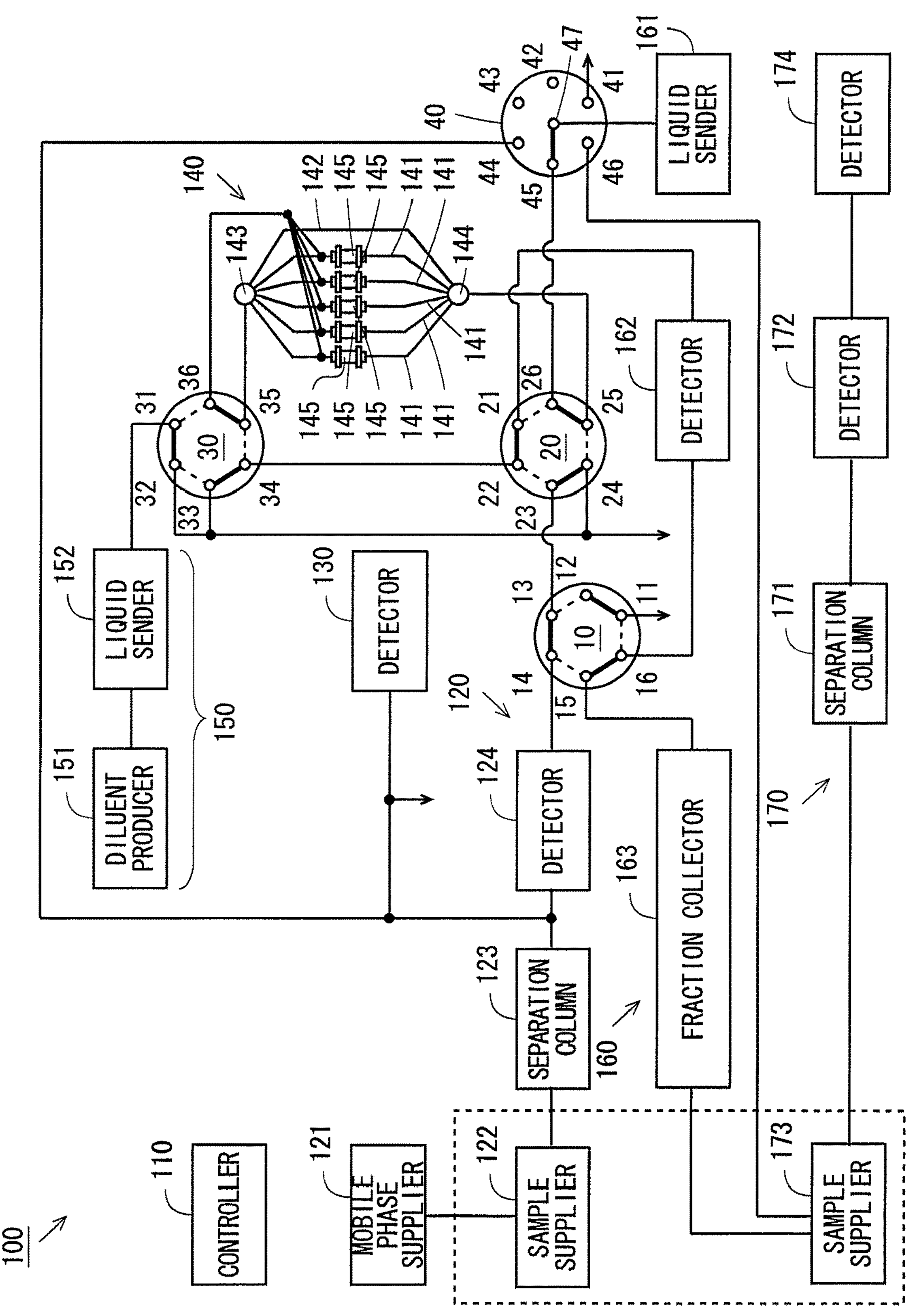
FIG. 13 is a diagram showing the configuration of a preparative system in a second modified example.

While the detector 130 detects a sample eluted from the separation column 123 of the separator 120 and detects a sample eluted from the separation column 171 of the analyzer 170 in the present embodiment, the embodiment is not limited to this. FIG. 13 is a diagram showing the configuration of a preparative system 100 in a second modified example. As shown in FIG. 13, the preparative system 100 does not include the flow-path switcher 50. Further, an analyzer 170 also includes a detector 174. The detector 174 has the similar configuration to that of a detector 130 and is provided downstream of a detector 172.

In the present example, the detector 130 detects a portion of a sample eluted in a separation column 123 during a first-dimensional operation. On the other hand, a detector 174 of the analyzer 170 detects a sample eluted in the separation column 171 and led out from the downstream end portion of the detector 172 during an analysis after a second-dimensional operation. The detector 174 may be provided downstream of the detector 172 in the preparative system 100 according to the first modified example of FIG. 9.

<4> Other Embodiments (1) While the detector 124 is provided in the separator 120 and the detector 162 is provided in the recoverer 160 in the above-mentioned embodiment, the embodiment is not limited to this. As long as the trap column 145 of the collector 140 can collect any sample components, the detector 124 does not have to be provided in the separator 120, and the detector 162 does not have to be provided in the recoverer 160.

While the detector 172 is provided in the analyzer 170 in the third embodiment, the embodiment is not limited to this. As long as sample components can be detected by the detector 130 or the detector 174, the detector 172 does not have to be provided in the analyzer 170.

(2) While the detector 130 is a mass spectrometer in the above-mentioned embodiment, the embodiment is not limited to this. The detector 130 may be another detector capable of detecting sample components introduced together with a makeup solution. For example, the detector 130 may be a flame ionization detector, a light scattering detector, a charged particle detector, or the like.

While the detector 174 of the analyzer 170 is similarly a mass spectrometer in the second modified example, the embodiment is not limited to this. The detector 172 may be another detector capable of detecting sample components introduced together with a makeup solution and may be a detector of a type different from the detector 130.

<5> Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. As each of various elements recited in the claims, various other elements having configurations or functions described in the claims can be also used.

In the above-mentioned embodiment, the sample suppliers 122, 173 are examples of first and second sample suppliers, and the separation columns 123, 171 are examples of first and second separation columns. The detector 130 is an example of a first detector or a common detector, the detectors 172, 174 are examples of a second detector, the liquid sender 161 is an example of a liquid sender, and the flow-path switchers 40, 50 are respectively examples of first and second flow-path switchers.

<6> Aspects

It is understood by those skilled in the art that the plurality of above-mentioned illustrative embodiments are specific examples of the below-mentioned aspects.

(Item 1) A preparative system according to one aspect may include a mobile phase supplier that supplies a first mobile phase, a first sample supplier that supplies a sample to the first mobile phase supplied by the mobile phase supplier, a first separation column through which the sample supplied by the first sample supplier passes through, a first detector that detects the sample that has passed through the first separation column, a trap column that collects components of the sample that has passed through the first separation column based on a detection result provided by the first detector, and a liquid sender that supplies a make-up solution to the first detector and supplies an eluent for eluting the sample to the trap column.

In this preparative system, a make-up solution is supplied to the first detector, so that a sample that has passed through the first separation column is detected. Further, an eluent is supplied to the trap column, so that a sample collected in the trap column is eluted. Because the makeup solution and the eluent are supplied by the common liquid sender, it is not necessary to separately provide a device for supplying a makeup solution and a device for supplying an eluent. This can prevent an increase in size and an increase in cost of the preparative system.

(Item 2) The preparative system according to item 1, may further include a first flow-path switcher that is switchable between a state in which the liquid sender and the first detector are connected by a flow path and a state in which the liquid sender and the trap column are connected to each other by a flow path.

In this case, it is possible, with a simple configuration, to selectively supply a makeup solution to the first detector and supply an eluent to the trap column.

(Item 3) The preparative system according to item 1 or 2, may further include a fraction collector that recovers an eluted sample into a container from the trap column.

In this case, the sample collected by the trap column can be recovered and contained in the container.

(Item 4) The preparative system according to item 3, may further include a second sample supplier that supplies the sample recovered into the container by the fraction collector to a second mobile phase, a second separation column through which the sample supplied by the second sample supplier passes through, and a second detector that detects the sample that has passed through the second separation column, wherein the liquid sender may further supply the second mobile phase.

In this case, it is possible to evaluate the purity of a sample recovered in the container by using a detection result provided by the second detector. Here, because the second mobile phase is supplied by the same liquid sender as the liquid sender that supplies a makeup solution and an eluent, it is not necessary to separately provide a device for supplying the second mobile phase. This can prevent an increase in size and an increase in cost of the preparative system.

(Item 5) The preparative system according to item 2, may further include a fraction collector that recovers an eluted sample from the trap column into a container, a second sample supplier that supplies the sample recovered into the container by the fraction collector to a second mobile phase, a second separation column through which the sample supplied by the second sample supplier passes through, and a second detector that detects the sample that has passed through the second separation column, wherein the liquid sender may further supply the second mobile phase, and he first flow-path switcher may further be switchable to a state in which the liquid sender and the second sample supplier are connected to each other through a flow path.

In this case, it is possible to evaluate the purity of a sample recovered into the container by using a detection result provided by the second detector. Here, because the second mobile phase is supplied by the same liquid sender as the liquid sender that supplies a makeup solution and an eluent, it is not necessary to separately provide a device for supplying the second mobile phase. This can prevent an increase in size and an increase in cost of the preparative system.

Further, the connection state of the flow path is switched by the above-mentioned first flow-path switcher. Therefore, it is possible, with a simple configuration, to supply a makeup solution, supply an eluent and supply the second mobile phase.

(Item 6) The preparative system according to item 4 or 5, wherein the first detector and the second detector may be included in a common detector that selectively detects a sample that has passed through the separation column and detects a sample that has passed through the second separation column.

In this case, it is not necessary to separately provide the first detector and the second detector. This can prevent an increase in size and an increase in cost of the preparative system.

(Item 7) The preparative system according to item 6, may further include a second flow-path switcher that is switchable between a state in which the first separation column and the common detector are connected to each other through a flow path and a state in which the second separation column and the common detector are connected to each other through a flow path.

In this case, it is possible, with a simple configuration, to selectively detect a sample that has passed through the first separation column and detect a sample that has passed through the second separation column.

(Item 8) The preparative system according to any one of items 1 to 7, wherein the first detector may include a mass spectrometer.

In this case, the sample components that have passed through the first separation column can be analyzed in detail.

The invention claimed is:

1. A preparative system comprising:

a mobile phase supplier that supplies a first mobile phase;

a first sample supplier that supplies a sample to the first mobile phase supplied by the mobile phase supplier;

a first separation column through which the sample supplied by the first sample supplier passes through;

a first detector that detects the sample that has passed through the first separation column;

a trap column that collects components of the sample that has passed through the first separation column based on a detection result provided by the first detector; and a liquid sender that supplies a make-up solution to the first detector and supplies an eluent for eluting the sample to the trap column.

2. The preparative system according to claim 1, further comprising a first flow-path switcher that is switchable between a state in which the liquid sender and the first detector are connected by a flow path and a state in which the liquid sender and the trap column are connected to each other by a flow path.

3. The preparative system according to claim 1, further comprising a fraction collector that recovers an eluted sample into a container from the trap column.

4. The preparative system according to claim 3, further comprising:

a second sample supplier that supplies the sample recovered into the container by the fraction collector to a second mobile phase;

a second separation column through which the sample supplied by the second sample supplier passes through; and a second detector that detects the sample that has passed through the second separation column, wherein the liquid sender further supplies the second mobile phase.

5. The preparative system according to claim 2, further comprising:

a fraction collector that recovers an eluted sample from the trap column into a container;

a second sample supplier that supplies the sample recovered into the container by the fraction collector to a second mobile phase;

a second separation column through which the sample supplied by the second sample supplier passes through; and a second detector that detects the sample that has passed through the second separation column, wherein the liquid sender further supplies the second mobile phase, and the first flow-path switcher is further switchable to a state in which the liquid sender and the second sample supplier are connected to each other through a flow path.

6. The preparative system according to claim 4, wherein the first detector and the second detector are included in a common detector that selectively detects a sample that has passed through the separation column and detects a sample that has passed through the second separation column.

7. The preparative system according to claim 6, further comprising a second flow-path switcher that is switchable between a state in which the first separation column and the common detector are connected to each other through a flow path and a state in which the second separation column and the common detector are connected to each other through a flow path.

8. The preparative system according to claim 1, wherein the first detector includes a mass spectrometer.

* * * * *